United States Patent [19]

Spraggins

[11] 3,880,906

[45] Apr. 29, 1975

[54] NOVEL COMPOUNDS RELATED TO PROSTAGLANDINS

[75] Inventor: Robert L. Spraggins, San Jose, Calif.

[73] Assignee: Alza Corporation, Palo Alto, Calif.

[22] Filed: May 24, 1971

[21] Appl. No.: 146,530

[52] U.S. Cl.... 260/468 D; 424/211 R; 424/247.2 R; 424/293.65; 424/410; 424/469; 424/473 R; 424/476 R; 424/486 R; 424/488 R; 424/501.1; 424/501.15; 424/501.17; 424/514 D; 424/305; 424/317

[51] Int. Cl....................... C07c 61/36; C07c 69/74

[58] Field of Search.................... 260/468, 514, 488

[56] References Cited
OTHER PUBLICATIONS

Pike et al., J.O.C. 34, 3552 (1969).

Spraggins, Tet. Letters, 4343 (1972).

*Primary Examiner*—Robert Gerstl
*Attorney, Agent, or Firm*—Paul L. Sabatine; Edward L. Mandell; Steven D. Goldby

[57] ABSTRACT

Novel compounds of the formula

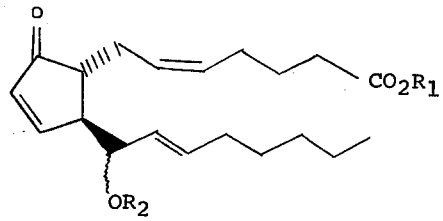

wherein $R_1$ is hydrogen or alkyl, $R_2$ is hydrogen or acyl, the diastereomers, and the pharmaceutically acceptable salts. The compounds are useful as antihypotensive agents and as intermediates for preparing prostaglandins possessing therapeutic properties.

6 Claims, No Drawings

NOVEL COMPOUNDS RELATED TO PROSTAGLANDINS

BACKGROUND OF THE INVENTION

The present invention relates to both novel and useful prostaglandins. More particularly, the invention pertains to new prostaglandin compounds represented by the Formula 1 of the following general formula:

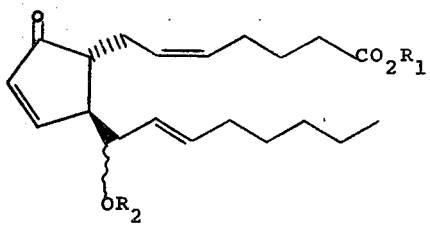

Formula 1 wherein $R_1$ is a member selected from the group consisting of hydrogen and lower alkyl, $R_2$ is a member selected from the group consisting of hydrogen and acyl, the diastereomers and the nontoxic, pharmaceutically acceptable salts.

In the present disclosure and the accompanying claims the definitions of symbols and terms in the foregoing formula and where they appear elsewhere throughout this specification and the accompanying claims, their usage thereof has the following significance.

By "lower alkyl" is meant straight or branched chain alkyl radicals of 1 to 8 carbon atoms inclusive, such as, methyl, ethyl, n-propyl, iso-propyl, n-butyl, sec-butyl, pentyl, neo-pentyl, n-hexyl, iso-hexyl, heptyl, 4,4-dimethyl pentyl, 2,2,4-trimethylpentyl, and the like.

Exemplary of "acyl" groups are the acyl groups having from 1 to 18 carbon atoms inclusive such as alkanoyl, alkenoyl, aroyl, and the like. Typical alkanoyl groups include formyl, valeryl, acetyl, propionyl, heptanoyl, octanoyl, undecanoyl, lauroyl, palmitoyl, stearoyl, oleoyl, isomeric forms thereof, and the like; typical alkenoyl groups include acryloyl, methacryloyl, crotonyl, 3-butenoyl, β-methyl-α-butenoyl, and the like; typical aroyl groups such as benzoyl, phenylacetyl, cinnamoyl, naphthoyl, p-ethoxybenzyl, allyloxyphenylacetyl, and the like. Exemplary of other acyl moieties within the scope of the invention are carboxacyl moieties such as cyclohexanecarbonyl, 3-cyclohexanecarbonyl, p-chlorophenoxyacetyl, succinyl, p-nitrobenzoyl, furoyl, 3-pyridinecarbonyl, and the like.

The phrase "pharmaceutically acceptable" or "non-toxic salts" generally includes the non-toxic alkali metal and the non-toxic alkaline earth bases such as sodium, potassium, calcium, lithium, copper and magnesium, the hydroxides and the carbonates thereof, the ammonium salts and the substituted ammonium salts, for example, the non-toxic salts of trialkylamines such as triethylamine, trimethylamine, tri-isopropylamine, tri-n-propylamine, and other amines such as morpholine, diethylamine, dimethylamine, methylcyclohexylamine, glucosamine, procaine, dibenzylamine, triethanolamine, N-benzyl-β-phenylethylamine, ethyldimethylamine, triethanolamine, N-benzyl-β-phenylethylamine, ethyldipropylamine, benzylamine, p-ethoxybenzylamine, N-(lower)alkyl piperidines, such as N-ethylpiperidine, N-methylpiperidine and other pharmaceutically acceptable amines. Also, non-toxic salts with monoalkyl and dialkylamines, and tetraalkylammonium hydroxides. The latter are art called therapeutically acceptable quaternary ammonium salts.

The numbering system and the stereochemistry nomenclature used for the compounds of this invention is the art accepted numbering and nomenclature. That is, the cyclopentane ring of the prostanoic acid is numbered 8 through 12 inclusive for a 20 carbon prostaglandin. The carboxyl side chain ($R_1$=H or alkyl) is bonded to the cyclopentane ring at the ring's 8 position, and the alkyl side chain is bonded to the cyclopentane ring at the ring's 12 position. The stereochemistry of the substituents on the cyclopentane ring, when shown, may be α-oriented or β-oriented, that is α-substituents are oriented on the same side of the cyclopentane ring as the carboxyl side chain, and β-substituents are oriented in the opposite sense or on the same side as the alkyl side chain. The substituents bonded to the alkyl side chain may have a sinister (S) or rectus (R) configuration which is equivalent to α and β respectively, in the projection formula used here. In the formulae, a broken line indicates an α-configuration, a solid wedge a β-configuration and a wavy line indicates that these substituents are in the α-configuration or the β-configuration. The numbering system and stereochemistry is reported in *Progress in the Chemistry of Fats and Other Lipids*, Vol IX, Part 2, pages 233 to 236, Pergamon Press, New York; and, *J. Lipids Research*, Vol. 10, pages 316 to 319, 1969.

DESCRIPTION OF THE INVENTION

The novel compounds of Formula 1:

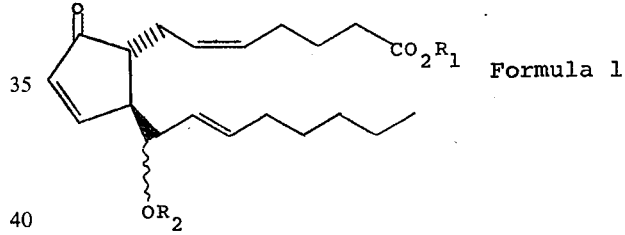

Formula 1 wherein $R_1$ and $R_2$ are previously defined, its carboxylate esters, alcoholic esters, salts, the diastereomers and enantiomeric forms thereof, are prepared from 15(R)-acetoxy-9-oxo-5-cis,10,13-transprostatrienoic acid, its carboxylate ester, and salts thereof as embraced by formula 2:

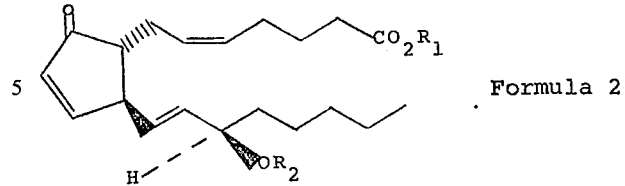

Formula 2 wherein $R_1$ and $R_2$ are as above defined, by a chemical process consisting of the steps of first chemically contacting and reacting stoichiometrically amounts of a compound embraced by Formula 2, with at least stoichiometrically equivalent amounts or with an exces of from 1 to about 10 or more molecular equivalents of an aliphatic acid of the formula $C_nH_{2n+1}COOH$ wherein $n$ is 0 to 12 inclusive, and in the presence of trace to equal molar quantities or an excess thereof of the acid's corresponding alkali metal or alkaline earth metal salt of the general formula $(C_nH_{2n+1}CO_2)_xM$ wherein M is an alkali metal or an alkaline earth metal and $x$ is 1 or 2 to produce from Formula 2 the corresponding diastereoisomeric C-13 and C-15 ester. The alkali metal salt or the alkaline earth metal salt can be added directly to the reaction comprising Formula 2 and the aliphatic acid or it can be formed in situ by the reaction of at least equal molar amounts of the aliphatic acid with equal molar amounts or an excess thereof of an alkali metal base or alkaline earth metal base of the formula $M(OH)_x$ where M and x are as defined above. The C-13 and C-15 esters are generally produced at a temperature of about 10° to 40° C, at a pressure of 1 atmosphere to 10 atmosphere, with accompanying reaction periods of about 5 minutes to about 66 hours, and the like.

The diastereoisomeric C-13 and C-15 esters are next converted to the corresponding diastereoisomeric C-13 and C-15 hydroxylates by hydrolyzing the respective ester with at least stoichiometric amounts or with an excess thereof of a lower alkanol and in the presence of a small amount of an acid catalyst to produce the diastereoisomeric C-13 and C-15 hydroxylates. The hydrolyzing reaction can be carried out with or without stirring at temperatures from 0° to 70° C for about 1/2 to 25 hours, at a pressure of 1 to 5 atmosphere, or until the formation of the diastereomeric 13-hydroxylate or C-15 hydroxylate is completed. The hydrolyzing reaction is usually carried out by gently stirring and warming the reaction mixture at about 25° to 45° C to ensure a mixing of the reactants, and then allowing the reaction mixture to stand and the reactants to react at ambient temperature, usually 25° C for about 1 to 25 hours. The C-13 hydroxylates and C-15 hydroxylates are recovered from the reaction medium by adding aqueous sodium chloride solution or saturated brine to the reaction mixture and then extracting the just formed aqueous reaction mixture with a water immiscible organic solvent. The separated organic solvent extract is evaporated to dryness to yield a mixture containing the diastereoisomeric C-13 hydroxylates and C-15 hydroxylates.

The C-13 hydroxylates and C-15 hydroxylates present in the mixture are separated from each other by first dissolving the mixture in an organic solvent, for example, benzene, and then washed onto a column comprising about 40 to 60 grams of column support, for example, silicic acid, silica gel and the like, for each gram of mixture containing the C-13 and C-15 hydroxylates. The compounds are then chromatographically separated by eluting them from the column with an elutant, for example, 10 to 20% ethyl acetate in benzene fractions of about 75 to 125 mls collected to obtain C-13 hydroxylate and C-15 hydroxylate. Generally, the fraction from 15 to about 49 contains C-13 hydroxylates and fractions 50 to 75 contain the C-15 hydroxylate.

The diastereoisomeric hydroxylates can be separated into the diastereoisomers by employing column chromatography on active support column systems such as acid washed silica gel, silicic acid, acidic alumina, neutral alumina, mixtures thereof, and the like, with elution of the diastereoisomers with lower alkanoates such as ethyl acetate, propyl acetate, methyl butyrate, mixtures thereof, mixtures of these with cyclohexane, benzene, ethanol, and the like, elutants consisting of ethyl acetate-hexane-water-methanol-acetic acid, ethyl acetate and more polar additives such as ethyl acetate-formic acid, ethyl acetate-acetone-acetic acid, cyclohexane-ethyl acetate-acetic acid and the like to yield the diastereoisomers; *J. Lipid Research*, Vol 10, pages 316 to 319, 1969.

Exemplary of aliphatic acid of the general formula $C_nH_{2n+1}COOH$ as defined above are acids such as formic, acetic, propionic, butyric, valeric, caproic, enanthylic, caprylic, pelargonic, capric, undecylic, lauric, tridecoic, the isomeric forms thereof, and the like.

Exemplary of the alkali metal or alkaline earth metal salts of the general formula $(C_nH_{2n+1}CO_2)_xM$ are where M is a metal comprising Group IA of the periodic system comprising lithium, sodium, potassium, rubidium and cesium; and, also where M is a metal of Group IIA of the periodic system comprising calcium, strontium, barium and magnesium. Typical salts are sodium formate, sodium acetate, calcium propionate, barium valerate, lithium enanthylate, potassium caproate, cesium lauroate, lithium acetate and the like.

Exemplary of alkaline earth metal bases and alkali metal bases are lithium hydroxide, sodium hydroxide, potassium hydroxide, cesium hydroxide, calcium hydroxide, barium hydroxide, magnesium hydroxide, and the like.

Representative of lower alkanols are alkanols of 1 to 8 carbons inclusive, of the straight or branched chain type such as methanol, ethanol, iso-propanol, n-butanol, and the like.

Representative of acid catalysts suitable for performing the reactions are p-toluenesulfonic acid, hydrochloric acid, anhydrous hydrobromic acid, Lewis acids such as boron trifluoride, boron trifluoride etherate, boron trichloride etherate, stannic oxychloride, phosphorous oxychloride, phosphorous pentachloride, and the like. Representative of water-immiscible solvents generally include benzene, toluene, carbon tetrachloride, ether, cyclohexane, methylene chloride, and the like.

The carboxylate esters of the novel and useful prostaglandins of the invention are obtained by art known chemical procedures, for example, by reacting the prostaglandin when $R_1$=H with a solution containing a diazo(lower)alkane to produce the prostaglandin carboxylate ester. Esterification of the prostaglandin acid is performed by reacting the prostaglandin acid with the diazoalkane, for example, diazomethane, diazoethane, diazopropane, diazobutane, etc., in an inert organic solvent, for example, lower alkanols, symmetrical and unsymmetrical ethers, and halogenated solvents. Representative of suitable solvents are ethanol, methanol, diethyl ether, methylethyl ether, tetrahydrofuran, acetone, chloroform, etc., or with mixtures thereof. The esterification reaction is usually performed at a temperature of 0° to 75° C, usually at room temperature and atmospheric pressure, with the prostaglandin ester recovered by evaporation of the solvent and like techniques. The esterification reaction is described in *Organic Chemistry*, by Fieser and Fieser, pages 180 to 181, 1944.

The esterification of the prostaglandin (when R=1) can also be carried out by transforming the acid to an inorganic salt, for example, followed by reacting the salt with a hydrocarbyl halide. Examples of suitable halides are methyl iodide, butyl iodide, iso-propyl iodide, tert-butyl iodide, benzyl iodide and the like. The silver salts are made by art known processes, such as dissolving the prostaglandin in cold, diluted aqueous ammonia, next, evaporating the excess ammonia in vacuo, and then adding stoichiometric amounts of silver nitrate; *Textbook of Organic Chemistry*, Richter, G. H., 1952, John Wiley & Sons.

The prostaglandins, as embraced by the above Formula 1, can be converted to their non-toxic, pharmaceutically acceptable salts ($R_1$=H) by neutralizing the prostaglandin with an equivalent or an excess amount of the corresponding non-toxic salt forming organic or inorganic base. The salts are prepared by procedures known to the art, for example, equivalent or stoichiometric quantities of the prostaglandin and the organic base are dissolved in an inert organic solvent at room temperature or in a warmed solvent with a gentle mixing of the reacting prostaglandin and the base until all the reactants are in solution. The product or salt is obtained by chilling the resulting mixture to precipitate the powder or crystals, or the product can be isolated by the addition of a miscible diluent of low polarity, or by the use of standard evaporation techniques. The formation of inorganic prostaglandin salts is also carried out by procedures known to the art; for example, the prostaglandin is dissolved in an aqueous solution containing stoichiometric amounts or an excess amount of a non-toxic salt forming inorganic hydroxide, carbonate or the like. This reaction can be carried out in the presence of an inert organic solvent, and the product is obtained by procedures such as the evaporation of the aqueous medium, or the organic medium, by the addition of miscible solvents of low polarity, or by chilling the mixture to precipitate the product.

The starting compounds used for the purpose of this invention, as illustrated by generic Formula 2, are isolated from the gorgonian, *Plexuara homomalla* (Esper). The *Plexuara homomalla* consists of an outer cortex and an inner skeleton. The compounds of the Formula 2 can be isolated from the intact gorgonian or from its outer cortex. The cortex can be easily separated from the skeleton in either a wet or dry form. When the dry form is employed, the gorgonian is air dried for several days at room temperature and the cortex stripped from the skeleton. Next, the cortex is ground to a fine mesh size in a conventional laboratory grinder. The resulting ground material is then extacted with an organic solvent or with an aqueous media that forms an aqueous emulsion that itself can be extracted with an organic solvent to produce a crude extract of the gorgonian, *Plexaura homomalla*. The crude extract is next separated by chromatographic procedures, for example, column chromatography, thin layer chromatography, paper chromatography or the like to obtain the starting compounds. The isolation of prostaglandin derivatives from *Plexuara homomalla* is reported in *Tetrahedron Letters*, No. 59, pages 5185 to 5188, 1969.

The following examples are set forth as representative methods of the spirit of the invention. These examples are not to be construed as limiting the scope of the invention as other functionally equivalent means will be readily apparent to those skilled in the subject art in the light of the present specification and accompanying claims.

EXAMPLE 1

Preparation of methyl 15(R)-acetoxy-9-oxo-5-cis,10,13-trans-prostatrienoate, the methyl acetate diester of 15-epi-PGA$_2$, as depicted in Formula 2. First, 450 grams of gorgonian *Plexaura homomalla* is freshly dried at room temperature and the cortex stripped from the inner skeleton. Then, the removed cortex is ground to a fine mesh, and the ground cortex is extracted with commercially available, standard grade hexane. The cortex is extracted by placing the ground cortex in a conical filter funnel equipped with filter paper and extracted with hexane by passing the hexane over the ground cortex until the resulting solution showed no color. The excess solvent from the extraction is removed on a conventional rotary evaporator, and the last traces of solvent are removed using a standard high vacuum pump until a constant weight is observed. About 43 grams of hexane extractables are extracted from the employed quantity of gorgonian.

Next, the hexane extract is subjected to conventional fractionation techniques. The fractionation technique employed in this run consists of first column chromatography of a 2.5 inch diameter column packed with 490 grams of silicic acid, commerically available as SiliCAR, CC-7, using benzene as the solvent for the packing procedure. Next, 83 grams of the crude extract obtained according to the procedure described immediately above, is placed on the column in a benzene solution and it is washed into the column with more benzene. The crude extract is then eluted from the column using measured volumes of solvents of increasing polarity as follows: first, 4000 ml of benzene; second, 1000 ml of 20% ethylacetate in benzene; third, 1000 ml of 40% ethylacetate in benzene; fourth, 1000 ml of 60% ethyl acetate in benzene; and, fifth, 1000 ml of ethylacetate. The percent recovered is 90.6.

Further purification and isolation of the compound is carried out as follows: first, 70 grams of silicic acid (CC-4) is packed into a 1.25 inch diameter column as a benzene slurry. After preparing the column, it is washed with about 500 ml of benzene. Next, 1.5 grams of the sample obtained from the 20% ethyl acetate in benzene fraction of the 2.5 inch column is washed into the smaller 1.25 inch column, with benzene. The fraction is eluted from the latter column by using 8% ethyl acetate in benzene, and at a flow rate of 2 ml per minute, and 13 fractions of 50 ml each were taken. Fractions 6 to 12 contain the prostaglandin diester. Thin layer chromatography is used to identify the diester. The analytical results are as follows: high resolution mass spectrum (m−60=330.2187; i.e., $C_{21}H_{30}O_3$): the mass spectrum showed peaks at m/e of 390, 359, 330, and 190 (base peak): ORD spectrum (CH$_3$OH) peak at 247 m$\mu$ and through at 218 m$\mu$; uv max (MeOH) 215 m$\mu$,$\epsilon$=9,300. The IR spectra shows peaks at IR (film) 1735, 1710, 1585, 1455, 1435, 1370, 1310, 1240, 1165, 1015, 965, 885, 810, and 720 cm$^{-1}$ and IR (CHCl$_3$) 1730, 1710, 1585, 1455, 1435, 1370, 1310, 1240, 1205, 1170, 1145, 1015, 965, and 880 cm$^{-1}$. The NMR spectrum (CCl$_4$) shows peaks $\delta$7.44 (1,dd,J=z,6Hz), 6.12 (1,dd,J=2,6Hz), 5.48 (4 proton vinyl envelope), 5.14 (1, m), 3.61 (3,6), 1.98 (3,S), and 0.89 (3, perturbed triplet).

EXAMPLE 2

Preparation of diastereomeric methyl 15-formoxy-9-oxo-5-cis,10,13-trans-prostatrienoate. A 300 mg sample of methyl 15(R)-acetoxy-9-oxo-5-cis,10,13-trans-prostatrienoate is dissolved in a reaction product obtained by reacting 8 ml of formic acid and 80 mg of potassium carbonate to give an in situ potassium formate, and the mixture stirred to ensure a contacting of the reactants. The reaction is allowed to proceed for about 70 hours at room temperature and then the solvent is evaporated on a rotary evaporator at about 30° C with a vacuum assist. Next, about 20 ml of toluene is added to the residue and the mixture shaken and again evaporated to remove any remaining formic acid. The residue is then filtered through a small column with an inside diameter of 1.0 inches containing 30 grams of silicic acid, commercially available as SilicAR, CC-7, using 20% ethyl acetate in benzene as the eluting solvent. The solvent is again evaporated to give a 70 to 80% conversion of the C-15 acetoxy to a mixture of formates as determined by NMR spectroscopy. The product mixture weighed about 0.290 grams.

EXAMPLE 3

Preparation of diastereomeric methyl 15-hydroxy-9-oxo-5-cis,10,13-trans-prostatrienoate and methyl 13-hydroxy-9-oxo-5-cis,10,14-trans-prostatrienoate. A 56 mg sample of the product prepared according to the procedure of Example 2 is dissolved in 10 ml of a freshly prepared mixture consisting of 95% dry methanol and 5% 1N hydrochloric acid with slight stirring to ensure a complete mixing of the ingredients. Next, the solution is magnetically stirred at room temperature and pressure for about 24 hours. The product is then recovered from the reaction solution by first removing most of the methanol by stripping in vacuo, followed by adding 50 ml of 100% ethyl acetate to the residue and extracting the ethyl acetate residue mixture 3 times with 10 ml portions of 50% brine. The organic, ethyl acetate phase with washings were combined, dried over anhydrous $MgSO_4$ and evaporated to yield 0.048 grams of a mixture of diastereomeric methyl 15-hydroxy-9-oxo-5-cis,10,13-trans-prostatrienoate and methyl 13-hydroxy-9-oxo-5-cis,10,14-trans-prostatrienoate.

EXAMPLE 4

Separation of methyl 15-hydroxy-9-oxo-5-cis,10,13-trans-prostatrienoiate, methyl 13-hydroxy-9-oxo-5-cis,10,14-trans-prostatrienoate, and methyl 15(S)-hydroxy-9-oxo-5-cis,10,13-trans-prostatrienoate. A 7.5 gram mixture of the prostatrienoates prepared according to the procedure of Examples 2 and 3 is first dissolved in benzene and gently added to a previously packed silicic acid column. The column was prepared by packing 400 grams of silica gel, SilicAR, CC-4, 100–200 mesh, Mallinckrodt Chemical Works, Inc., in a benzene slurry, onto a standard 2 inch diameter column. The column was packed to have approximately 50 grams of support for 1 gram of sample and a flow rate of 3 to 5 ml per minute was used for the separation. The prostaglandins were eluted from the column with a 11% ethyl acetate in benzene elutant, and 100 ml fractions were taken, which on concentration yielded the separated products. The fractions starting at 16 and ending at 30 contained methyl 13-hydroxy-9-oxo- 5-cis,10,14-trans-prostatrienoate, fractions 31 to 47 methyl 15-hydroxy-9-oxo-5-cis,10,13-trans-prostatrienoate, and fractions 48 to 94 methyl 15(S)-hydroxy-9-oxo-5-cis,10,13-trans-prostatrienoate.

EXAMPLE 5

Preparation of 13-hydroxy-9-oxo-5-cis,10,14-trans-prostatrienoic acid. To 0.037 grams of methyl 13-hydroxy-9-oxo-5-cis,10,14-trans-prostatrienoate as prepared according to Example 4 is added 1 ml of tert-butyl alcohol and 2 ml of 1N hydrochloric acid and the mixture allowed to react for 96 hours under ambient conditions. The progress of the reaction is determined by thin layer chromatography with a 40% ethyl acetate: 1% acetic acid: 59% hexane solvent and the $R_f$ determined by measuring the distance the product moved in cm divided by the distance of the solvent front in cm. The $R_f$ for the product is 0.48 and for the starting material 0.65. Next, the reaction mixture is diluted with 100 ml of 100% ethyl acetate and extracted 3 times with 20 ml portions of 50% brine. After drying over anhydrous $MgSO_4$, and removing the solvent in vacuo, the yield of product recovered is 0.034 grams.

EXAMPLE 6

Preparation of racemic propyl 13-hydroxy-9-oxo-5-cis,10,14-trans-prostatrienoate. A solution of 1 mole of racemic 13-hydroxy-9-oxo-5-cis,10,14-trans-prostatrienoic acid in a mixture of 10 ml of dry methanol and 90 ml of dry diethyl ether is mixed at room temperature with an excess of diazopropane in diethyl ether and allowed to stand for about 60 minutes. The mixture is evaporated to dryness under reduced in-house pressure to obtain the product comprising racemic propyl 13-hydroxy-9-oxo-5-cis,10,14-trans-prostatrienoate.

EXAMPLE 7

Following the procedure of Example 6 but substituting for diazopropane other diazoalkanes, for example, diazoethane, diazobutane, diazohexane, and the like, to produce esters such as racemic ethyl 13-hydroxy-9-oxo-5-cis,10,14-trans-prostatrienoate, racemic butyl 13-hydroxy-9-oxo-5-cis,10,14-trans-prostatrienoate, racemic hexyl 13-hydroxy-9-oxo-5-cis,10,14-trans-prostatrienoate, and the like.

EXAMPLE 8

Preparation of racemic 13-hydroxy-9-oxo-5-cis,10,14-trans-prostatrienoic acid. To a three neck flask is added 0.1 mole of 13-hydroxy-9-oxo-5-cis,10,14-trans-prostatrienoic acid 10 ml of propionic anhydride and 10 ml of pyridine and the reaction medium allowed to stand at room temperature for 4 hours. Next, the mixture is concentrated to dryness under reduced in-house vacuum to give 13-propoxy-9-oxo-5-cis,10,14-trans-prostatrienoic acid, which is purified by chromatography over synthetic magnesium silicate using as the eluant n-hexane, b. 60°–68° C containing increased amount of acetone.

EXAMPLE 9

Following the procedure of Example 8 but substituting for propionic anhydride butyric anhydride, acetic anhydride, succinyl chloride and the like, the corresponding acylated compound is produced by the interaction of the hydroxyl group with the respective acylating agent.

The new compounds of the invention comprising the diasteriomeric methyl 13-hydroxy-9-oxo-5-cis,10,14-trans-prostatrienoates is characterized by using nuclear magnetic resonance spectroscopy (N.M.R.), infrared (I.R.), ultraviolet spectroscopy (U.V.), and mass spectroscopy (M.S.). The results of the instrumentation studies showed that the new compounds possess a C-13 hydroxyl function and a carbon carbon double bond at C-14 to C-15. The diastereomeric C-13 hydroxyl compounds each exhibited a double doublet signal for their corresponding C-11 proton, one occurring at approximately $\delta 7.83$ (J=2,4). The doubly allylic C-12 methine proton of 15(S)-hydroxy-9-oxo-5-cis,10,13-trans-prostatrienoic acid at $\delta 3.2$ (M) is noticeably absent in the NMR spectrum of the 13-hydroxyl diastereomers, which is attributed to the absence of the C-13 to C-14 double bond.

The mass spectrum analysis for the new compounds showed a parent ion at 348 (1% of base) with fragmentation peaks at 330 (M-18, 13% of base) and 190 (M-18-140, 57% of base). The latter represents a McLafferty cleavage of the entire carboxyl side chain. Additional peaks at 221 (71% of base) and 127 (31% of base) are consistant with the cleavage of the alkyl side chain at C-12 which is a favorable cleavage for the diastereomeric methyl 13-hydroxy-9-oxo-5-cis,10,14-trans-prostatrienoates but not a favorable cleavage for 15(S)-hydroxy-9-oxo-5-cis,10,13-trans-prostatrienoic acid due to its carbon carbon double bond at C-13.

The IR spectrum of the new compounds showed carbonyl absorption at 1740 cm$^{-1}$ for the methyl ester and 1710 cm$^{-1}$ for the cyclopentenone system. Characteristic hydroxyl absorption at 3450 cm$^{-1}$ and trans olefin at 970 cm$^{-1}$ were also present. The compounds showed a UV maximum at 217 m$\mu$.

The utility of the novel compounds of this invention as intermediates is set forth in Table 1.

produce methyl 15(S)-hydroxy-9-oxo-5-cis,10,13-trans-prostatrienoate (C) and diastereomeric methyl 13-hydroxy-9-oxo-5-cis,10,14trans-prostatrienoate (D). Compound D is converted by acid hydrolysis in an alcoholic medium aa described in Example 5 to 13-hydroxy-9-oxo-5-cis,10,14-trans-prostatrienoic acid (E). Compound E, now serving as a starting material, can be converted to D by esterification, and the esterified compounds D, now acting as an intermediate can be converted by rearrangement and epimerization according to Examples 2 through 4 to give compound C which has known medical utility as an antihypotension agent.

The novel 13-hydroxy prostaglandins as embraced by Formula 1 are therapeutically useful as antihypotension agents, that is, they are useful for the management of the elevation of low blood pressure in mammals, including primates, avians, household animals, valuable farm animals, laboratory animals, and the like. The novel prostaglandins can be administered in a variety of pharmaceutical forms, that is, as a pharmaceutical composition formulated by mixing the prostaglandins

TABLE 1

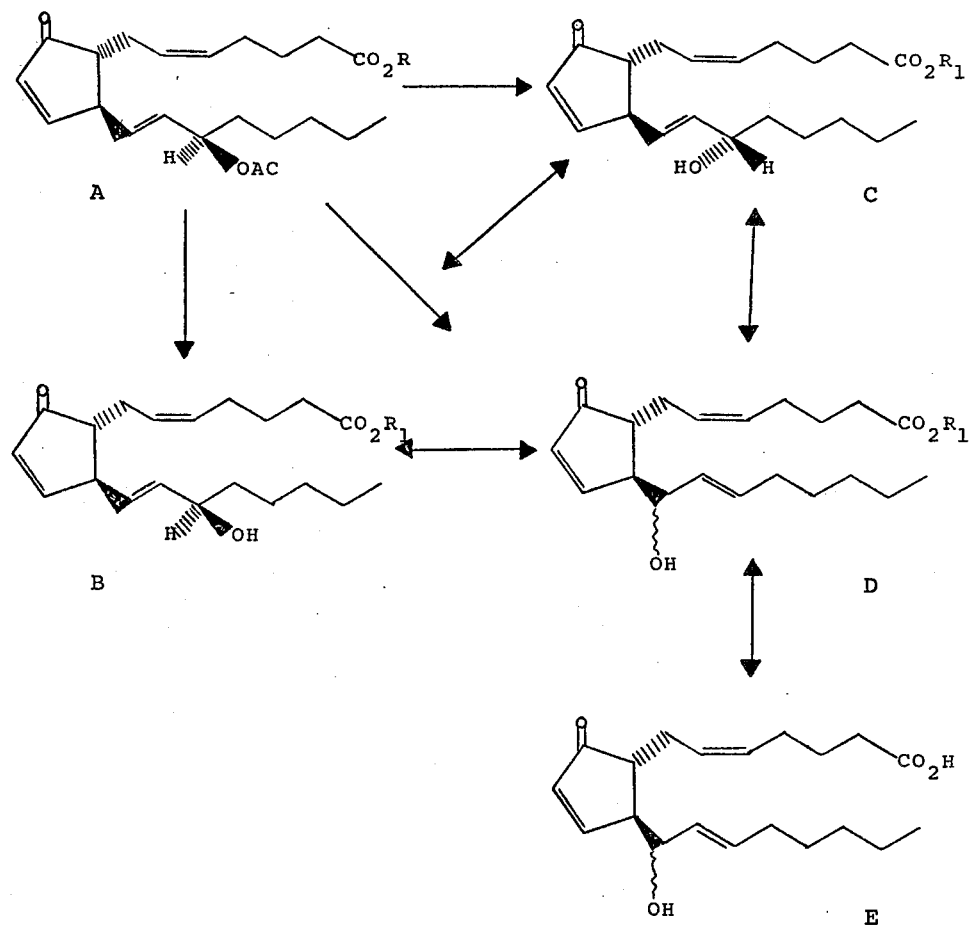

In Table 1, methyl 15(R)-acetoxy-9-oxo-5-cis,10,13-trans-prostatrienoate (A) is subjected to epimerization and hydrolysis as described in Examples 2 through 5 to produce methyl 15 (R)-hydroxy-9-oxo-5-cis,10,13-trans-prostatrienoate (B). Additionally, the reactions with a pharmaceutical carrier. The prostaglandins can be formulated into tablets, capsules, elixers, syrups, drops, powders, injectable preparations, and the like. The pharmaceutical carriers can be inorganic or organic, solid or liquid, and the pharmaceutical compositions can be administered enterally, parenterally, and the like. Exemplary of pharmaceutical carriers include water, saline, gelatin, sugar, such as lactose, glucose, sucrose, starches such as corn starch and arrowroot, stearic acid or salts thereof, such as magnesium or calcium stearate, talc, vegetable fats or oils, gums, alginic acid, benzyl alcohols, glycols and other known recipients. The pharmaceutical compositions may be sterilized and also contain adjuvants such as preserving, stabilizing, wetting, emulsifying agents and the like.

Exemplary of a typical method for preparing a tablet containing the active prostaglandin is to first suitably comminute the active ingredient with a diluent such as starch, sucrose, kaolin or the like to form a powder mixture. Next, the just prepared mixture can be granulated by wetting with a non-toxic binder such as a solution of gelatin, acacia mucilage, corn syrup and the like, and after mixing the composition is screened to any predetermined particle sieve size. As an alternative, if preferred to granulation, the just prepared mixture can be slugged through conventional tablet machines and the slugs comminuted before the fabrication of the tablets. The freshly prepared tablets can be coated or they can be left uncoated. Representative of suitable coatings are the non-toxic coatings including shellac, methylcellulose, carnauba wax, styrene-maleic copolymers, and the like. For oral administration, compressed tablets containing 0.01 micrograms, 1 milligram, 5 milligrams, etc., of prostaglandin are manufactured in the light of the above disclosure and by fabrication techniques well known to the art and set forth in *Remington's Pharmaceutical Science*, Chapter 39, Mack Publishing Co., 1965. A typical formulation for a tablet containing a prostaglandin, for example, 13-hydroxy-9-oxo-5-cis,10,14-trans-prostatrienoic acid, is described in Example 10.

EXAMPLE 10

|  | Per Tablet, mg |
|---|---|
| Prostaglandin | 2.0 |
| Corn Starch | 15.0 |
| Corn Starch Paste | 4.5 |
| Lactose | 82.0 |
| Calcium Stearate | 2.0 |
| Dicalcium Phosphate | 50.0 |

To formulate the tablet, uniformly blend the prostaglandin, corn starch, lactose, and dicalcium phosphate in a V-blender until all the ingredients are uniformly mixed together. Next, the corn starch is prepared as a 10% aqueous paste and it is blended with the uniform mixture until a second uniform mixture is obtained. Then, the wet granulation is passed through a standard 8 mesh screen, dried and rescreened with a 12 mesh screen. The dry granules are next blended with calcium stearate and compressed into tablets. Other tablets containing 0.05 mg, 2 g, 4 g, 10 g, 15 g, etc., are prepared in a like fashion.

The manufacture of capsules for oral use consists essentially of mixing the active compound with a non-toxic carrier and enclosing the mixture in a gelatin sheath. The capsules can be in the art known soft form of a capsule made by enclosing the compound in intimate dispersion within an edible oil or the capsule can be a hard capsule consisting essentially of the novel compound mixed with a non-toxic solid, such as talc, calcium stearate, calcium carbonate or the like. A typical capsule formulation is described in Example 11.

EXAMPLE 11

Capsules containing 0.1 mg, 10.0 mg, 15 mg, 20 mg, 1 g, 2 g, and the like, of prostaglandin, for example, methyl 13-hydroxy-9-oxo-5-cis,10,14-trans-prostatrienoate, are prepared by blending the following:

|  | Per Tablet, mg |
|---|---|
| Prostaglandin | 5.0 |
| Lactose U.S.P. | 300.0 |
| Starch | 130.0 |
| Magnesium Stearate | 4.5 |

The blended ingredients are discharged into a commercially available capsule, and with the higher concentrations of prostaglandin as the active ingredient in the capsule, a suitable reduction is made in the amount of lactose, or another appropriate non-toxic inert ingredient, for example, talc, can be added thereto.

The daily dose administered for the novel compounds will of course vary with the particular novel prostaglandin employed because of the varying potency of the compounds, the chosen route of administration and the size of the recipient. The dosage administered is not subject to definite bounds, but it will usually be an effective amount or the equivalent on a molar basis of the pharmacologically active free acid form of the prostaglandin to produce the desired physiological or pharmaceutical effects. Representative of a typical method for administering to a mammal the prostaglandins of the invention is by the oral route. By this route, 100 $\lambda$g to 750 $\lambda$g per kg of recipient per day is administered to evoke the desired antihypotension effects. Another method for administering the prostaglandins, for example, diastereoisomeric methyl 13-hydroxy-9-oxo-5-cis,10,14-trans-prostatrienoic is by the injectable-type administration route. By this route, a sterile solution containing the compound is administered intravenously or subcutaneously at the rate of 10 micrograms to 150 micrograms per kilogram of body weight per minute by means of an infusion pump to raise the blood pressure at the rate of 5 to 15 milliter per hour. The compound is administered by the injectable route in a form suited for injection, such as mixed with sterile physiological saline, or in aqueous solutions for subcutaneous administration having incorporated therein an agent that delays absorption such as aluminum monostearate and the like.

Suitable topical preparations can easily be prepared, for example, by mixing 500 mg to 1500 mg and the like of the prostagladins with 15 g of cetyl alcohol, 1 g of sodium lauryl sulfate, 40 g of liquid silicone D. C. 200, sold by Dow Corning Co., Midland, Michigan, 43 g of sterile water, 0.25 g of methylparaben and 0.15 g of propylparaben and warming the mixture with constant stirring to about 75° C and then permitting the preparation to congeal. The preparation can be readily applied to the skin by inunction or it can be applied topically by dispensing the preparation from a conventional surgical gauze dispenser, and the like.

For administering to valuable domestic household, sport or farm animals, such as sheep, goats, cattle, etc., or for administering to laboratory animals such as mice, rats, guinea pigs, monkeys, etc., for scientific studies, the new compound is prepared in the form of a food premix, such as mixing with dried fish meal, oatmeal, straw, hay, ground corn, mash, and the like, and then the prepared premix is added to the regular feed, thereby administering the compound to the domestic or laboratory animal in the form of feed. The prostaglandin can also be administered to laboratory animals in laboratory studies for determining the therapeutic utility of the prostaglandin to mammals, including humans, avians and other valuable animals by other well known methods. For example, in laboratory studies with standard white laboratory rats, the compounds, for example, diastereoisomeric 13-propoxy-9-oxo-5-cis,10,14-trans-prostatrienoic acid can be administered orally by perfusion in saline at the rate of 10 microgram to 25 microgram per kg of rat body weight per minute across the mucosal surface of the stomach to study blood pressure elevation, their regulatory effects on salt, water and lipids.

The above examples and disclosure are set forth merely for illustrating the mode and the manner of the invention and various modifications and embodiments can be made by those skilled in the art in the light of the invention without departing from the spirit of the invention.

I claim:
1. Novel compounds of the formula:

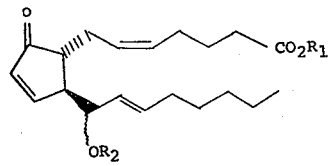

wherein $R_1$ is a member selected from the group consisting of hydrogen and lower alkyl of 1 to 8 carbon atoms inclusive, $R_2$ is a member selected from the group consisting of hydrogen and acyl of 1 to 18 carbon atoms selected from the group consisting of alkanoyl, alkenoyl and aroyl, and non-toxic salts thereof and wherein $OR_2$ at the 13 position is in the rectus-sinister configuration.

2. Lower alkyl 13-hydroxy-9-oxo-5-cis,10,14-trans-prostatrienoate.

3. 13-alkanoyloxy-9-oxo-5-cis,10,14-trans-prostatrienoic acid.

4. Methyl 13-acetoxy-9-oxo-5,cis,10,14-trans-prostatrienoate.

5. 13-acetoxy-9-oxo-5-cis,10,14-trans-prostatrienoic acid.

6. 13-propoxy-9-oxo-5-cis,10,14-trans-prostatrienoic acid.

* * * * *